United States Patent
Perkins et al.

(10) Patent No.: US 7,065,717 B1
(45) Date of Patent: Jun. 20, 2006

(54) TREE-BASED INTERFACE APPARATUS FOR DISPLAY OF CALL DEPENDENCIES AND METHOD THEREFOR

(75) Inventors: Alan Curtis Perkins, Indianapolis, IN (US); Paul Brian Young, Indianapolis, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/232,622

(22) Filed: Jan. 19, 1999

(51) Int. Cl.
*G06F 3/00* (2006.01)

(52) U.S. Cl. .................. 715/854; 715/853; 715/804; 715/810; 715/835

(58) Field of Classification Search ............. 345/352, 345/356, 357, 353, 966, 967, 346; 712/216, 712/243; 715/781, 792, 804, 810, 835, 853, 715/854, 966, 967; 717/125
See application file for complete search history.

(56) References Cited

U.S. PATENT DOCUMENTS

| | | | | |
|---|---|---|---|---|
| 4,558,413 A | | 12/1985 | Schmidt et al. ............. | 364/300 |
| 5,067,072 A | | 11/1991 | Talati et al. ................. | 395/650 |
| 5,301,325 A | | 4/1994 | Benson ........................ | 395/700 |
| 5,313,387 A | | 5/1994 | McKeeman et al. ........ | 364/400 |
| 5,325,531 A | | 6/1994 | McKeeman et al. ........ | 395/700 |
| 5,365,606 A | | 11/1994 | Brocker et al. ............. | 395/650 |
| 5,430,873 A | | 7/1995 | Abe et al. ................... | 395/650 |
| 5,689,711 A | | 11/1997 | Bardasz et al. ............. | 395/701 |
| 5,758,160 A | | 5/1998 | McInerney et al. ......... | 395/701 |
| 5,911,072 A | * | 6/1999 | Simonyi ........................ | 717/1 |
| 5,917,492 A | * | 6/1999 | Bereiter et al. ............. | 715/854 |
| 6,002,396 A | * | 12/1999 | Davies ........................ | 345/339 |
| 6,002,872 A | * | 12/1999 | Alexander et al. .......... | 717/127 |
| 6,028,999 A | * | 2/2000 | Pazel ............................ | 717/4 |
| 6,055,227 A | * | 4/2000 | Lennert ....................... | 370/254 |
| 6,097,888 A | * | 8/2000 | Simonyi ........................ | 717/5 |

OTHER PUBLICATIONS

"Distributed Parallel Build System for Hierarchically Organized Large Scale Software Systems", *IBM Technical Disclosure Bulletin*, vol. 39, No. 06, Jun 1996, pp. 63-68.

"Method for Generating Ordered Build Dependencies", *IBM Technical Disclosure Bulletin*, vol. 38, No. 09, Sep. 1995, p. 161.

"Method or Partitioning a Program Call Graph into Functional Clusters", *IBM Technical Disclosure Bulletin*, vol. 38, No. 09, Sep. 1995, pp. 147-151.

* cited by examiner

*Primary Examiner*—Kieu D. Vu
(74) *Attorney, Agent, or Firm*—Gerald H. Glanzman; Robert A Voight, Jr.; Jeffery S. LaBaw

(57) ABSTRACT

Apparatus and methods for the hierarchical display of routine call dependencies in a software program are implemented. A list of routines in a preselected software program is displayed in first and second regions in a window on an display device. By selecting a routine in the list in the first region, one or more routines called by the selected routine are displayed, in a tree hierarchy beneath the selected routine. Selection of a routine in the list in the second region displays, in a tree hierarchy, routines that call the selected routine.

27 Claims, 4 Drawing Sheets

TREE-BASED INTERFACE APPARATUS FOR DISPLAY OF CALL DEPENDENCIES AND METHOD THEREFOR

CROSS REFERENCE TO RELATED APPLICATION

The present invention is related to U.S. patent application Ser. No. 09/232,621, entitled Apparatus for Cross Referencing Routines and Method Therefor.

TECHNICAL FIELD

The present invention relates in general to data processing systems, and in particular, to the display of call dependencies in software programs.

BACKGROUND INFORMATION

It is commonplace in the data processing art for software to be written in a modular structure. The tasks which the software performs are typically embodied in a set of subtasks which, depending on the development environment, may be referred to as procedures, functions, methods, subroutines or events. An event is a particular software routine that receives user interactions via standard user interface devices. Although, again depending on the development system, these may have different connotations, for the purposes of the present invention they will be collectively referred to as routines.

A complex software program which may be typical of the complex tasks performed by modern data processing systems may include a multitude of such procedures. Moreover, routines typically refer to other routines, whereby a hierarchical structure results. In a sophisticated software product, a complex hierarchical, or nested, chain of routine references may result. Tracking this hierarchical chain of dependencies as a development of a software program progresses, may be difficult. Additionally, maintenance of the product, which may be performed by persons other than the developers, may also be complicated by the complex hierarchical structure. Thus, there is a need in the art for a mechanism to track and display the cross referencing of procedures in data processing software, thereby allowing the programmer to have knowledge of the calling and called routines that will be affected if changes are applied to any given routine.

SUMMARY OF THE INVENTION

The aforementioned needs are addressed by the present invention. Accordingly, there is provided, in a first form, a method of displaying hierarchical call dependencies. The method includes the step of selecting a routine from a routine list displayed in one of the first and second window regions. Displaying one of a first routine called by the routine and a second routine calling the routine in response to the selection constitutes another step of the method.

There is also provided, in a second form, a data processing system circuitry operable for selecting a routine from a routine list displayed in one of the first and second window regions. Also included is circuitry operable for displaying one of a first routine called by the routine and a second routine calling the routine in response to the selection.

Additionally, there is provided, in a third form, a computer program product operable for storage on program storage media, the program product operable for displaying hierarchical call dependencies includes programming for selecting a routine from a routine list displayed in one of the first and second window regions, and programming for displaying one of a first routine called by the routine and a second routine calling the routine in response to the selection.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
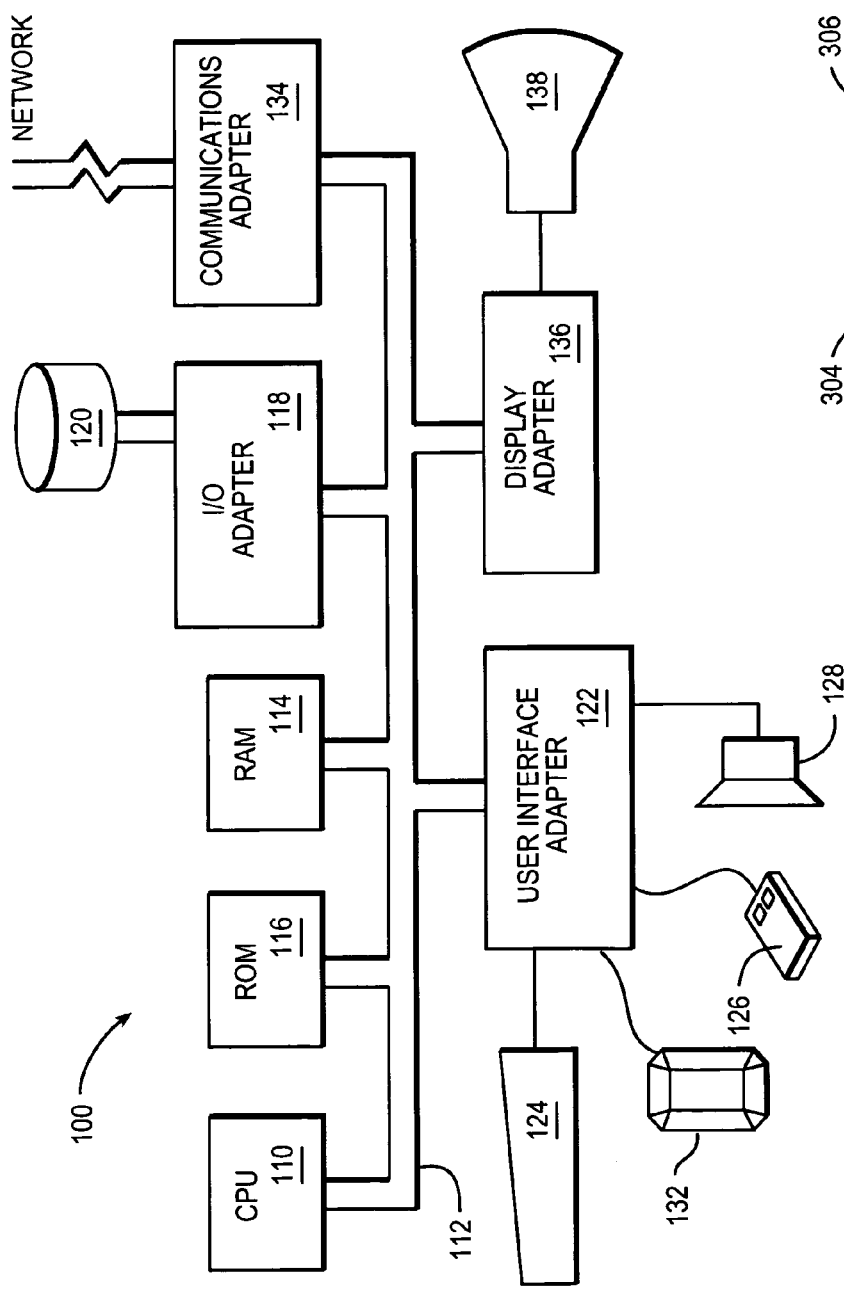
FIG. 1 illustrates, in block diagram form, a data processing in accordance with one embodiment of the present invention.

The present invention provides a mechanism for the display of routine call dependencies in data processing software. A call dependency may refer either to a routine calling another routine, or to a routine being called by another routine. A database containing a plurality of data structures corresponding to the routines in the data processing software is accessed. A mechanism for the creation of the database is the subject matter of co-pending, commonly assigned U.S. patent application Ser. No. 09/232,621, entitled "Apparatus for Cross Referencing Routines and Method Therefor," hereby incorporated herein by reference. A display window is created which includes two routine lists. The first list is for the hierarchical display of routines that a selected routine calls. A second list is for the hierarchical display of routines called by a selected routine. Initially, the lists display all the routines in the software program. The user may then select routines in each of the lists for display, in hierarchical fashion, other routines which the selected routine calls, or which are called by the selected routine. The routine displayed depends on the list, either the first or the second, from which the selection is made and corresponds to a called or calling routine, respectively.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Refer now to the figures wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110, which is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention as defined by the appended claims.

Figure 2A:
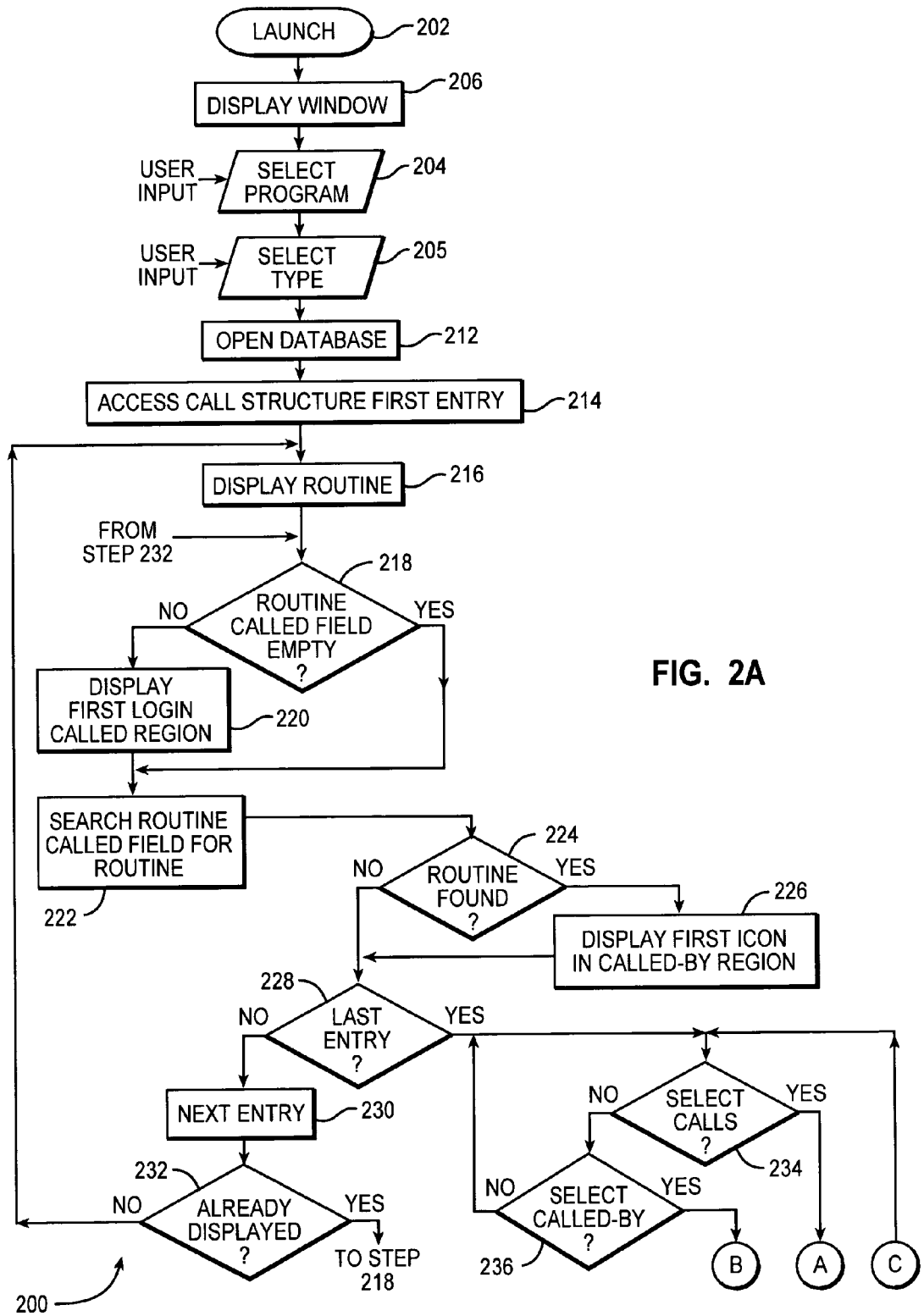
FIG. 2 illustrates, in flow chart form, a call dependency display methodology in accordance with an embodiment of the present invention.
Figure 2B:
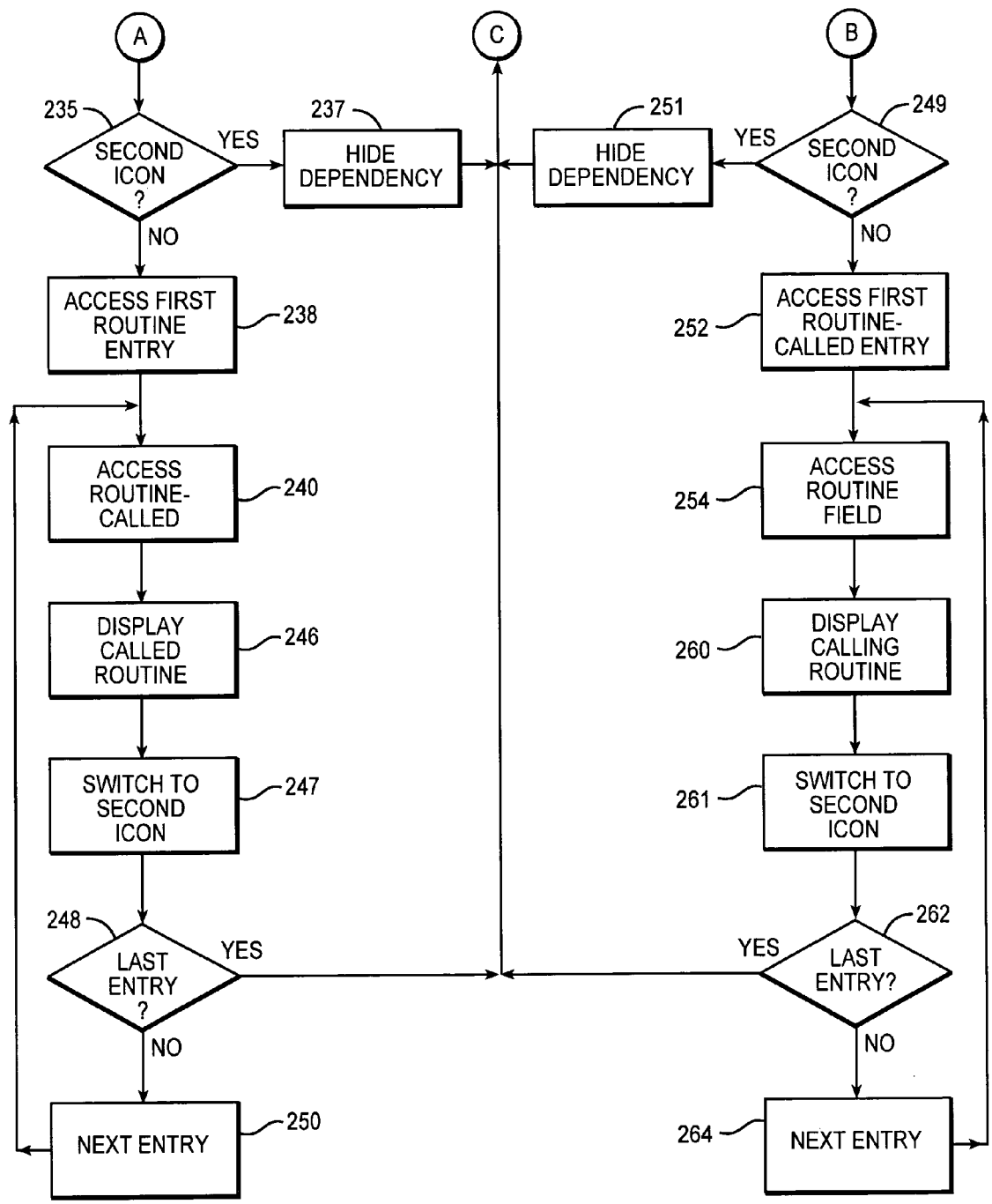

Refer now to FIG. 2 in which is illustrated display methodology 200 in accordance with the present invention. Methodology 200 is launched in step 202A, and a window for the current transaction is displayed on a display device, such as, display 138 in FIG. 1. In response to user input, the software program for which the call dependencies are to be displayed is entered in step 204. In step 205, a routine type may be specified, which may be used to limit the initial called by and called lists to routines corresponding to that type. Exemplary types may include events and functions.

In step 212, a routine database corresponding to the program selected in step 204 is opened. The routine database includes a plurality of data structures corresponding to the routines defined in the program. An apparatus and method for creating such a routine database, and the data structures therein, is the subject of co-pending, commonly assigned, U.S. patent application Ser. No. 09/232,621, entitled "Apparatus for Cross Referencing Routines and Method Therefor," incorporated herein by reference.

Figure 3:
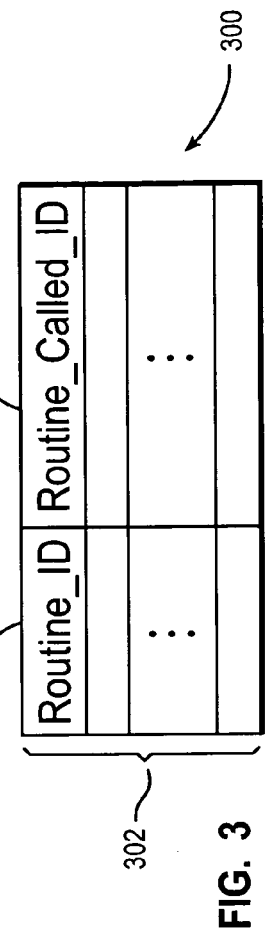
FIG. 3 schematically illustrates a call table used in an embodiment of the present invention.

In step 214, a first entry in a call data structure, or call table, contained in the database opened in step 212, is accessed. An exemplary call table, which may be generated in accordance with the principals described in the above-referenced co-pending commonly assigned U.S. patent application, call table 300, is illustrated in FIG. 3.

Call table 300 includes a plurality of entries 302. Each entry includes a routine identifier (ID) field 304, and a routine-called ID field 306. There is at least one entry 302 for each routine in the software program whose called dependencies are to be displayed. The routine ID, or routine name, is contained in the corresponding routine ID field 304. If the routine whose identifier appears in field 304 calls another routine, the identifier corresponding to the routine called is contained in the corresponding routine-called ID field 306. Thus, because a given routine may call a plurality of other routines, there may be a plurality of entries 302 corresponding to a particular routine.

Returning to FIG. 2, in step 216, the routine identifier corresponding to the first entry is displayed in a routine list on a display device, such as, display device 138 in FIG. 1. The routine list is displayed in a first window region and a second window region in the display window created in step 202. The first window region may be used to display, in hierarchical fashion, routines that a selected routine calls. Conversely, the second window region may display the routine list for showing routines which are called by a selected routine. The display window, and the first and second window regions will be further described in conjunction with FIG. 4. For simplicity, displaying a routine identifier may hereinafter be referred to as displaying a routine. It would be understood by an artisan of ordinary skill that for the purposes of the present invention, the display of the routine identifier is intended. Likewise, selecting a displayed routine identifier may simply be referred to as selecting a routine.

In step 218, it is determined if the corresponding routine-called field contains an identifier corresponding to a called routine. If, an identifier is contained in the routine-called field (corresponding to the "No" branch in step 218) a first icon is associated with the routine displayed in step 216 in the routine list in the window region for the display of called routines. The first icon denotes that the associated routine has a call dependency that may be hierarchically displayed. This will be further described in conjunction with FIG. 4. This window region may be referred to as the "calls" region. If, however, in step 218, the routine-called field is empty, the routine displayed in step 216 has no called dependencies and step 220 is bypassed.

In step 222, each routine-called field 304 is searched for the identifier corresponding to the routine displayed in step 216. If the routine is found, in step 224, then that routine is itself called by another routine, and in step 226, the first icon, which indicates that the particular routine has an undisplayed called dependency is associated with the display of that routine in the window region corresponding to the display of routines that call a particular routine. This window region may be referred to as a "called-by" region. If, however, in step 224, the identifier of the routine displayed in step 216 is not found, then, that routine is not called by another routine, and step 226 is bypassed.

Steps 216–226 are repeated for each entry in the call table accessed in step 214. In step 228, it is determined if a last entry has been displayed. If not, in step 230, the next entry in the call table is accessed, and in step 232, it is determined if the routine corresponding to the identifier in the respective routine ID field 302 has been displayed. If it has not been displayed, then methodology 200 displays the routine by returning to step 216. Otherwise, the return is to step 218, and the call dependencies are then displayed by executing steps 218–226, as previously described.

In step 234, it is determined if a user has selected a routine in the list displayed in the calls region box. If not, it is next determined, in step 236, if a routine in the list in the called-by window region has been selected. If not, methodology 200 returns to step 234, and loops between steps 234 and 236 until a selection is made.

If, in step 234, the user selects a routine in the list displayed in the calls window region, in step 235, it is determined if a second icon is associated with the selected routine. The second icon, set in step 247 below, denotes that the call dependency of the selected routine is already displayed. If the second icon is displayed in step 235, the dependency is hidden in step 237, and methodology 200 returns to step 234.

If, however, the call dependency is not already displayed in step 238, an entry 302 corresponding to the routine selected is accessed. In step 240, the corresponding routine-called ID field 306 is accessed. In step 246, the called routine is displayed.

A given routine may call a plurality of routines within its definition. Thus, call table 300 may include a plurality of entries 302. In step 248, it is determined if a last entry has been accessed. If so, methodology 200 returns to step 234. Otherwise, a next entry is accessed, step 250, and methodology 200 returns to step 240 to obtain the identifier of the routine called and display it.

For a selected routine, a hierarchy based on calling routines may also be displayed. If, in step 236, a selection in the called-by window region is made, it is determined in step 249 if the second icon is associated with the second routine. If so, the displayed call dependency is hidden in step 251, and methodology 200 returns to step 234. Otherwise, the routine called ID field 306 for a first call table entry 302 is accessed, step 252.

In step 254, the corresponding routine ID field 304 is accessed. The calling routine is displayed in step 260, and the icon associated with the routine selected in step 236 is switched to the second icon, in step 261.

A given routine may be called by a plurality of routines. Thus, call table 300 may include a plurality of entries 302 containing the same routine in field 306. In step 262, it is determined if a last entry has been accessed. If so, methodology 200 returns to step 234. Otherwise, a next entry is accessed, step 264 and methodology 200 returns to step 254, to obtain the identifier of the calling routine and display it. If, in step 262, all entries 302 in the call table have been tested, then methodology 200 returns to step 234 and continues to loop through steps 234 and 236 in order to process further selections.

Figure 4:
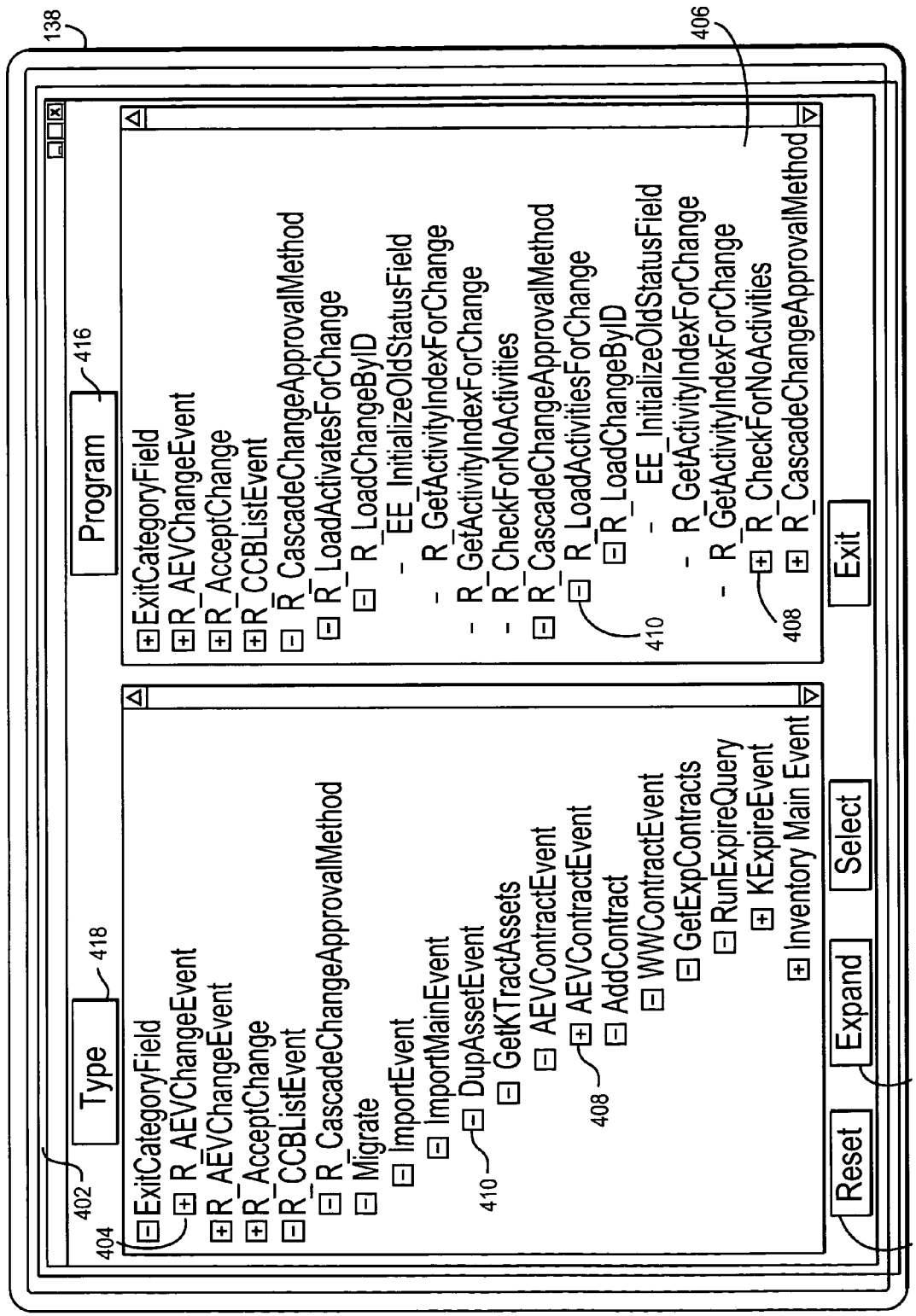
FIG. 4 illustrates a display device in accordance with an embodiment of the present invention.

Referring now to FIG. 4, there is illustrated therein an exemplary hierarchical display in accordance with the present invention. A window 402 is displayed on display device 138. Window 402 includes a called-by region 404 and a calls region 406. In each of regions 404 and 406, an exemplary list of routine identifiers, which will simply be referred to as routines, are displayed. Each routine in the list has an associated icon indicating whether the routine has any undisplayed called dependencies. A first icon 408 denotes that the corresponding routine has an undisplayed call dependency. In the exemplary embodiment of FIG. 4, the first icon 408 is a "+" symbol. If a call dependency of a routine in the list is displayed, a second icon is associated with the routine. In the exemplary embodiment of FIG. 4, the second icon 410 is an "−" symbol. A routine with no call dependency has no associated icon.

Call dependencies are displayed in a hierarchical fashion, forming a tree-based hierarchy, illustrated in called-by region FIG. 4. The hierarchy displayed in called-by region 404 depicts the routine which calls the routine preceding it in the hierarchical tree. Thus, the routine "R_CascadeChangeApprovalMethod", shown "highlighted" in region 404 is called by "Migrate", which, in turn, is called by "ImportEvent," etc.

Likewise, routines which are called by a selected routine are displayed in calls region 406 in an hierarchical tree. Thus, for example, "R_CascadeChangeApprovalMethod" shown highlighted in region 406 calls, inter alia, "R_LoadActivitiesForChange" and "R_GetActivityIndexForChange." The former itself calls other routines, which are displayed, as indicated by the "−" icon 410, while the latter calls no other routines, and therefore has no associated icon.

In an embodiment of the present invention, in both called-by region 404 and calls region 406, the call dependency hierarchy of a selected routine may be displayed by "mouse clicking" on the corresponding first icon 408, using mouse 126 in FIG. 1. Alternatively, the tree hierarchy may be displayed by positioning a cursor (not shown) at the selected routine, and activating Expand button 412. Additionally, a displayed hierarchy may be collapsed, or hidden, by mouse clicking on the second icon 410, or, alternatively, positioning a cursor at the selected routine and activating Reset button 414.

Additionally, window 402 includes program region 416 and type region 418. The software program for which the call dependencies are to be displayed may be entered by a user in program region 416, for example, using keyboard 124 of FIG. 1. Similarly, the initial routine lists displayed may be restricted to a particular type of routine by entering a type in region 418, as previously discussed in conjunction with FIG. 2.

The present invention provides a mechanism for displaying routine call dependencies in a software program in a tree hierarchy. Routines called by a selected routine are displayed in a hierarchical fashion. Similarly, a display, also in hierarchical fashion of routines calling a selected routine is also provided. The user may select a depth of the hierarchy of call dependencies for display, as well as limiting the display to a particular type of routine, such as, events. A call dependency hierarchy may be displayed or hidden, in response to user input.

Although the present invention and its advantages have been described in detail, it should be understood that various changes, substitutions and alterations can be made herein without departing from the spirit and scope of the invention as defined by the appended claims.

What is claimed is:

1. A method of displaying hierarchical call dependencies comprising the steps of:

selecting a routine from a routine list displayed in one of a first window region and a second window region, wherein said first window region comprises a calls window region and said second window region comprises a called-by-window region; and displaying one of a first set of routines called by said routine in said first window region and a second set of routines calling said routine in said second window region in response to said selection.

2. The method of claim 1 wherein said routine list is contained in a plurality of data structures stored in a database.

3. The method of claim 1 wherein said step of displaying one of said first set of routines and said second set of routines further comprises the step of displaying said one of said first set of routines and said second set of routines in a tree hierarchy.

4. The method of claim 1 wherein said step of selecting said routine from a routine list comprises the steps of selecting an icon associated with said routine, wherein said icon flags said routine as having an undisplayed routine dependency.

5. The method of claim 1 further comprising the step of accessing a data structure stored in a database, said data structure having an entry corresponding to said routine, and wherein said step of displaying said one of said first set of routines and said second set of routines comprises the step of displaying said one of said first set of routines and said second set of routines in response to a routine identifier, corresponding to said one of said first set of routines and said second set of routines, contained in a portion of said entry.

6. The method of claim 5 wherein said step of displaying said one of said first set of routines and said second set of routines further comprises the step of displaying said first set of routines in response to said routines identifier in a routine field of said entry.

7. The method of claim 5 wherein said step of displaying said one of said first set of routines and said second set of routines further comprises the step of displaying said second set of routines in response to said routine identifier in a routine called field of said entry.

8. The method of claim 1 further comprising the step of specifying a routine type, and wherein said step of displaying said one of said first set of routines and said second set of routines comprises the step of displaying said one of said first set of routines and said second set of routines in response to said routine type.

9. A method of displaying hierarchical call dependents comprising the steps of:

displaying a routine list in a first window region and a second window region;

selecting a routine from said routine list displayed in one of said first window region and said second window region; and displaying one of a first set of routines called by said routine in said first window region and a second set of routines calling said routine in said second window region in response to said selection.

10. A data processing system comprising:

circuitry operable for selecting a routine from a routine list displayed in one of a first window region and a second window region, wherein said first window region comprises a calls window region and said second window region comprises a called-by window region; and circuitry operable for displaying one of a first set of routines called by said routine in said first window region and a second set of routines calling said routine in said second window region in response to said selection.

11. The data processing system of claim 10 wherein said routine list is contained in a plurality of data structures stored in a database.

12. The data processing system of claim 10 wherein said circuitry operable of displaying one of said first set of routines and said second set of routines further comprises circuitry operable for displaying said one of said first set of routines and said second set of routes in a tree hierarchy.

13. The data processing system of claim 10 wherein said circuitry operable for selecting said routine from a routine list comprises circuitry operable for selecting an icon associated with said routine, wherein said icon flags said routine as having an undisplayed routine dependency.

14. The data processing system of claim 10 further comprising circuitry operable for accessing a data structure stored in a database, said data structure having an entry corresponding to said routine, and wherein said circuitry operable for displaying said one of said first set of routines and said second set of routines comprises circuitry operable for displaying said one of said first set of routines and said second set of routines in response to a routine identifier, corresponding to said one of said first set of routines and said second set of routines, contained in a portion of said entry.

15. The data processing system of claim 14 wherein said circuitry operable for displaying said one of said first set of routines and said second set of routines further comprises circuitry operable for displaying said first set of routines in response to said routine identifier in a routine field of said entry.

16. The data processing system of claim 14 wherein said circuitry operable for displaying said one of said first set of routines and said second set of routines further comprises circuitry operable for displaying said second set of routines in response to said routine identifier in a routine called field of said entry.

17. The data processing system of claim 10 further comprising circuitry operable for specifying a routine type, and wherein said step of displaying said one of said first set of routines and said second set of routines comprises circuitry operable for displaying said one of said first set of routines and said second set of routines in response to said routine type.

18. A data processing system comprising:

circuitry operable for displaying a routine list in a first window region and a second window region;

circuitry operable for selecting a routine from said routine list displayed in one of said first window region and said second window region; and circuitry operable for displaying one of the first set of routines called by said routine in said first window region and a second set of routines calling said routine in said second window region in response to said selection.

19. A computer program product comprising a tangible computer usable medium having computer useable program code for displaying hierarchical call dependencies, the computer program product including;

computer usable program code for selecting a routine from a routine list displayed in one of a first window region and a second window region, wherein said first window region comprises a calls window region and said second window region comprises a called-by-window region; and computer usable program code for displaying one of a first set of routines called by said routine in said first window region and a second set of routines calling said routine in said second window region in response to said selection.

20. The computer program product of claim 19 wherein said routine list is contained in a plurality of data structures stored in a database.

21. The computer program product of claim 19 wherein said computer usable program code for displaying one of said first set of routines and said second set of routines further comprises computer usable program code for display said one of said first set of routines and said second set of routines in a tree hierarchy.

22. The computer program product of claim 19 wherein said computer usable program code for selecting said routine from a route list comprises computer usable program code for selecting an icon associated with said routine, wherein said icon flags said routine as having an undisplayed routine dependency.

23. The computer program product of claim 19 further comprising computer usable program code for accessing a data structure stored in a database, said data structure having an entry corresponding to said routine, and wherein said computer usable program code for displaying said one of said first set of routines and said second set of routines comprises computer usable program code or displaying said one of said first set of routines and said second set of routines in response to a routine identifier, corresponding to said one of said first set of routines and said second set of routines, contained in a portion of said entry.

24. The computer program product of claim 23 wherein said computer usable program code for display said one of said first set of routines and said second set of routines further comprises computer usable program code for displaying said first set of routines in response to said routine identifier in a routine field of said entry.

25. The computer program product of claim 23 wherein said computer usable program code for displaying said one of said first set of routines and said second set of routines further comprises computer usable program code for displaying said second set of routines in response to said routine identifier in a routine called field of said entry.

26. The computer program product of claim 19 further comprising computer usable program code for specifying a routine type, and wherein said step of displaying said one of said first set of routines and said second set of routines comprises computer usable program code for displaying said one of said first set of routines and said second set of routines in response to said routine type.

27. A computer program product comprising a tangible computer usable medium having computer usable program code for displaying hierarchical call dependencies, the computer program product including:
- computer usable program code for displaying a routine list in a first window region and a second window region;
- computer usable program code for selecting a routine from said routine list displayed in one of said first window region and said second window region; and
- computer usable program code for displaying one of a first set of routines called by said routine in said first window region and a second set of routines calling said routine in said second window region in response to said selection.

* * * * *